United States Patent
Taylor

(10) Patent No.: US 7,413,343 B2
(45) Date of Patent: Aug. 19, 2008

(54) APPARATUS FOR DETERMINING A TEMPERATURE SENSING ELEMENT

(75) Inventor: John Philip Taylor, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 112 days.

(21) Appl. No.: 11/228,864

(22) Filed: Sep. 16, 2005

(65) Prior Publication Data
US 2007/0064768 A1 Mar. 22, 2007

(51) Int. Cl.
G01K 7/34 (2006.01)
G01K 7/16 (2006.01)
G08C 19/00 (2006.01)

(52) U.S. Cl. .............. 374/184; 374/170; 374/171; 702/99

(58) Field of Classification Search ......... 374/117, 374/118, 119, 170, 171, 163, 183, 184; 702/99, 702/132; 307/109, 110
See application file for complete search history.

(56) References Cited

U.S. PATENT DOCUMENTS

| | | | | |
|---|---|---|---|---|
| 3,657,644 A * | 4/1972 | Beam et al. | | 374/133 |
| 4,092,863 A * | 6/1978 | Turner | | 374/169 |
| 4,176,556 A * | 12/1979 | Takenaka | | 374/170 |
| 4,206,648 A * | 6/1980 | Tuska et al. | | 374/171 |
| 4,504,922 A | 3/1985 | Johnson et al. | | |
| 4,838,707 A * | 6/1989 | Ozawa et al. | | 374/171 |
| 4,910,689 A | 3/1990 | Shibamiya | | |
| 5,613,778 A * | 3/1997 | Lawson | | 374/170 |
| 6,091,255 A * | 7/2000 | Godfrey | | 324/760 |
| 6,157,897 A * | 12/2000 | Yoshikawa | | 702/132 |
| 6,320,512 B1 | 11/2001 | Nicholson et al. | | |
| 6,403,949 B1 * | 6/2002 | Davis et al. | | 250/227.27 |
| 6,629,776 B2 * | 10/2003 | Bell et al. | | 374/170 |
| 6,824,307 B2 | 11/2004 | Vail et al. | | |
| 6,874,933 B1 * | 4/2005 | Chan | | 374/171 |
| 6,975,525 B2 * | 12/2005 | Kernahan | | 363/98 |

(Continued)

FOREIGN PATENT DOCUMENTS

EP 0594483 4/1994

(Continued)

OTHER PUBLICATIONS

International Search Report (ISR): PCT/ISA/220, 210 for International Application No. PCT/US2006/035831, ISR dated Jan. 19, 2007, 5 pages.

(Continued)

Primary Examiner—Gail Verbitsky

(57) ABSTRACT

An apparatus and method measure a temperature of a temperature sensing element having a temperature dependent resistance based on a ratio of discharge times of a capacitor through a reference resistance and through the combination of the reference resistance in parallel with the temperature sensing element is disclosed. A reference discharge time is determined by measuring the discharge time of the capacitor from a first voltage to a second voltage through a reference resistance. A temperature evaluation discharge time is determined by measuring the time to discharge the capacitor from the first voltage to the second voltage through the reference resistance in parallel with the temperature sensing element. The ratio of the temperature evaluation discharge time to the reference discharge time is used to determine the temperature and produce a digital representation of the temperature.

10 Claims, 4 Drawing Sheets

U.S. PATENT DOCUMENTS

2002/0094010 A1* 7/2002 Vail et al. .................... 374/183
2006/0081471 A1* 4/2006 Kidwell ....................... 204/415
2007/0286259 A1* 12/2007 Kwon et al. ................ 374/170

FOREIGN PATENT DOCUMENTS

JP 60091229 A * 5/1985

OTHER PUBLICATIONS

Dallas Semiconductor, Maxim, Understanding Integrating ADCs, http://www.maxim-ic.com/appnotes,cfm/appnote number/1041, download date: Sep. 14, 2005, pp. 1-5.

* cited by examiner

| DISCHARGE TIME INFORMATION | |
|---|---|
| TEMPERATURE (°C) | $T_{TED}/T_{REF}$ X 32768 |
| -16 | 27846 |
| 0 | 23964 |
| 16 | 19202 |
| 32 | 14326 |
| 48 | 10112 |
| 64 | 6909 |
| 80 | 4686 |
| 96 | 3201 | ately

APPARATUS FOR DETERMINING A TEMPERATURE SENSING ELEMENT

FIELD OF THE INVENTION

The invention relates in general to temperature sensors and more specifically to an apparatus, system, and method for determining a temperature of a temperature sensing element.

BACKGROUND OF THE INVENTION

Temperature sensing elements have electrical characteristics that vary with temperature. By observing or measuring an electrical characteristic, the temperature of the temperature sensing element can be determined. For example, where the temperature sensing element is a thermistor that has a resistance that varies with temperature, temperature can be measured by determining the resistance of the thermistor. Conventional temperature sensing systems include any of several techniques for measuring electrical characteristics. In some conventional systems, the characteristic is directly measured. the resistance of the thermistor, for example, can be determined by measuring a voltage drop across the thermistor for an associated current flow. Such systems are limited, however, since the components and reference levels used for measuring must be accurate and reliable. In many devices utilizing temperature measuring systems, the low tolerance measuring components and additional components required to maintain a reliable reference value, such as a voltage, are prohibitively expensive. Other techniques include discharging or charging a capacitor through a reference resistor, charging or discharging the capacitor through the thermistor, and comparing the times to charge or discharge each component to determine the resistance of the thermistor. This conventional technique is limited in that the accuracy of the measurement depends on the values used for the resistor and capacitor. Accordingly, the accuracy of the temperature measurements are degraded where the capacitor value or resistor value vary over temperature, time, or between components. In addition, the accuracy of the measurement depends on the supply voltage used to charge the capacitor.

Accordingly, there is a need for an apparatus, system, and method for determining a temperature of a temperature sensing element.

DETAILED DESCRIPTION OF THE PREFERRED EMBODIMENTS

In accordance with an exemplary apparatus and method, a temperature of a temperature sensing element having a temperature dependent resistance is determined based on a ratio of discharge times of a capacitor through a reference resistance and through the combination of the reference resistance in parallel with the temperature sensing element. A reference discharge time is determining by measuring the discharge time of the capacitor from a first voltage to a second voltage through a reference resistance. A temperature evaluation discharge time is determined by measuring the time to discharge the capacitor from the first voltage to the second voltage through the reference resistance in parallel with the temperature sensing element. the ratio of the temperature evaluation discharge time to the reference discharge time is used to determine the temperature and produce a digital representation of the temperature.

Figure 1:
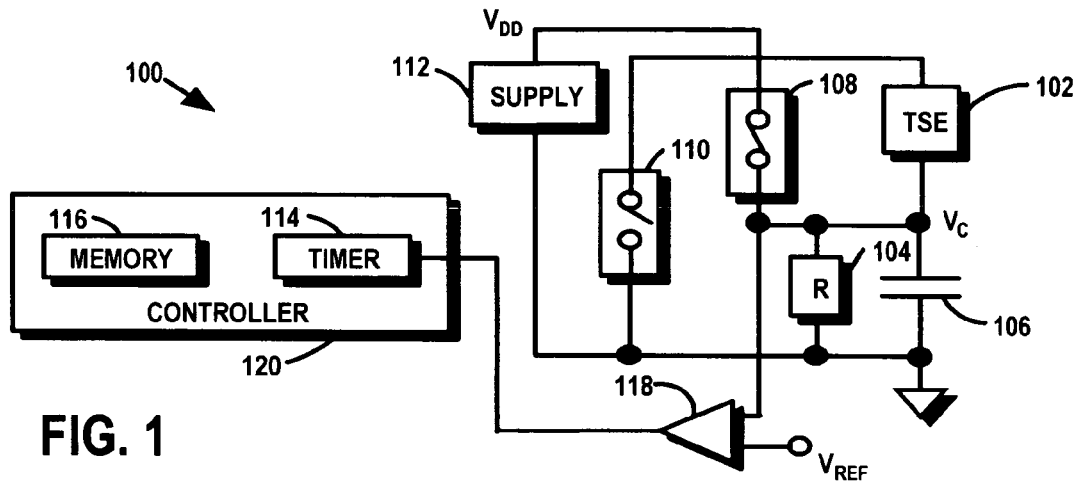
FIG. 1 is a block diagram of temperature measuring apparatus in a capacitor charging configuration in accordance with an exemplary embodiment of the invention.

FIG. 1 is a block diagram of an apparatus 100 for measuring temperature in accordance with the exemplary embodiment of the invention in a charging configuration. The various functional blocks of FIG. 1 may be implemented using any combination of hardware, software, and/or firmware. For example, although discrete components may be used in some circumstances, the switches 108, 110, comparator 118, controller 120, memory 116, and timer 114 are implemented as part of a microprocessor in the exemplary embodiment.

During operation, the switches 108, 110 are opened and closed to charge and discharge the capacitor 106 through the reference resistance 104 and through the temperature sensing element (TSE) 102 in parallel with the reference resistance 104. A reference discharge time ($T_{REF}$) is determined by measuring the time to discharge the capacitor 106 from a first voltage to a second voltage through the reference resistance 104. A temperature evaluation discharge time ($T_{TED}$) is determined by measuring the time to discharge the capacitor 106 through the parallel combination of the reference resistance 104 and the TSE 102 from the first voltage to the second voltage. the discharges times are measured by the controller 120 using the timer 114 by measuring the time for the capacitor voltage ($V_C$) to decline from the first voltage to the second voltage. In the exemplary embodiment, the first voltage is the supply 112 voltage ($V_{DD}$) and the second voltage is a reference voltage ($V_{REF}$). the ratio of the temperature evaluation discharge time ($T_{TED}$) to the reference discharge time ($T_{REF}$) is analyzed by the controller 120 to determine the temperature. In the exemplary embodiment, a table containing a plurality of $T_{TED}/T_{REF}$ ratio values with associated temperatures is stored in the memory 116 and is used to determine the temperature. any value derived from the discharge time ratio may be used to determine temperature depending on the particular implementation. For example, the discharge time ratio values are scaled by multiplying the ratios by 1000 in order to manage integer values in the exemplary embodiment. Accordingly, as referred to herein, the discharge time ratio applies to any value derived from the relationship between the reference discharge time and the temperature evaluation discharge time. In some cases, an algorithm can be used to calculate the temperature based on the discharge time ratio.

The TSE 102 is a thermistor in the exemplary embodiment that has a resistance that depends on temperature. Accordingly, the combined resistance of the TSE 102 in parallel with the reference resistance 104 changes with temperature. As explained below in further detail, the reference resistance 104 is a "linearizer" when in parallel with the TSE 102 thereby making the resistance vs. temperature curve of the parallel combination less exponential and more linear than the resistance vs. temperature curve the TSE 102 alone.

In the exemplary embodiment, the controller 120 controls the switches 108, 110 in accordance with the temperature sensing procedure. the controller 120 is any portion or combination of a computer, processor, microprocessor, processor arrangement, logic circuit, gate array, or other combination of hardware, software and/or firmware that performs the functions described herein. In the exemplary, embodiment the functions of the controller are performed by a microprocessor such as the PIC10F206 microprocessor available from the Microchip Corporation.

The values of the capacitor 106, TSE 102, and reference resistor 104 are selected to maximize resolution and dynamic range of the temperature measurement while minimizing measuring times. the selected value of the capacitor 106 depends on the reference resistance 104 value, the TSE 102 value, the desired temperature value resolution, and the desired maximum discharge time. the time constant of the three components in parallel is chosen to have a minimum value that results in an adequate number of clock cycles to provide the desired temperature resolution at high temperatures and a maximum value that results in a maximum discharge time at low temperatures to minimize errors due to changes in conditions such as supply voltage variations. the values are selected based on the lowest anticipated supply voltage and highest temperature that will be measured.

A first switch 108 is closed and the second switch 110 is opened to charge the capacitor 106. the supply 116 charges the capacitor 106 until the voltage ($V_C$) across the capacitor 106 reaches the voltage ($V_{DD}$) of the supply 116. In the exemplary embodiment, the controller 120 allows an adequate charge time for the capacitor 106 to reach the supply 112 voltage ($V_{DD}$) before changing the switches 108, 110 to the reference configuration of the temperature evaluation configuration. As explained below in further detail, the function of the switches 108, 110 are performed using general purpose input/output (GPIO) lines in the exemplary embodiment.

Figure 2:
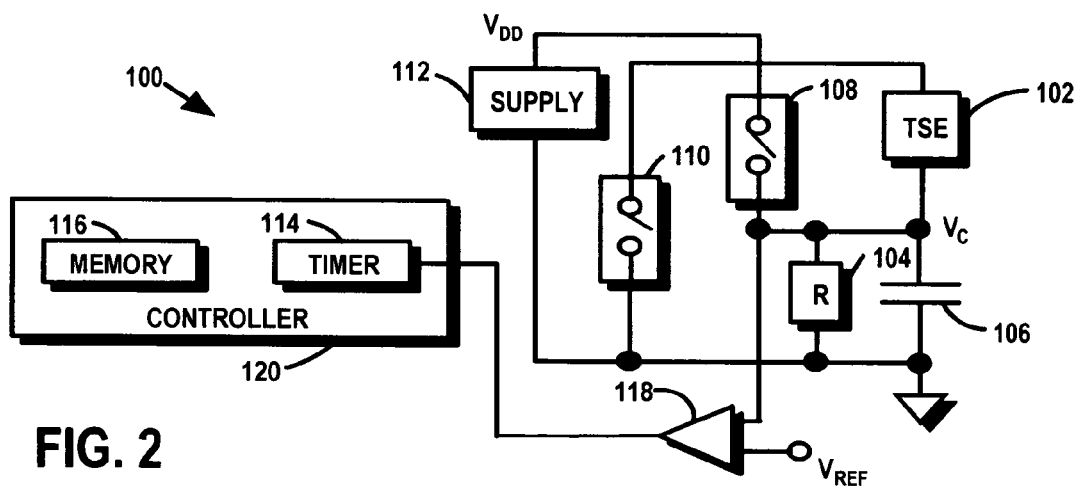
FIG. 2 is a block diagram of the temperature measuring apparatus in a reference discharge configuration in accordance with the exemplary embodiment of the invention.

FIG. 2 is a block diagram of the apparatus 100 for measuring temperature in accordance with the exemplary embodiment of the invention in a reference configuration. The reference discharge time ($t_{REF}$) is measured by opening all of the switches 108, 110 and allowing the capacitor 106 to discharge through the reference resistance 104. the reference resistance 104 is a single resistor having a tolerance of +/−1% in the exemplary embodiment. Other reference resistances 104 may be used in some circumstances. For example, parallel and/or serial combinations of multiple resistors may be used. the selection of the tolerance and temperature coefficient characteristics of the reference resistance 104 are guided by the desired accuracy of the final temperature result. the initial value of the reference resistor is guided by the effective linearization of the thermistor curve as a result of the parallel combination with the thermistor 102 in addition to the resulting ratios over the expected measurement range such that the desired measurement resolution may be achieved. In the exemplary embodiment, the reference discharge time ($t_{REF}$) is measured by counting a number of clock cycles from the time the switch 108 is opened until the capacitor 106 voltage ($V_C$) reaches the reference voltage ($V_{REF}$). Accordingly, the timer 114 is a counter in the exemplary embodiment. the comparator 118 determines when the capacitor voltage ($V_C$) is equal to the reference voltage ($V_{REF}$). the comparator 118 is a standard comparator circuit within the microprocessor in the exemplary embodiment. Other devices or methods may be used to determine when the capacitor voltage ($V_C$) has reached the reference voltage, however. For example, a logic threshold of a GPIO may be used to perform the functions of the comparator 118 in some circumstances.

The reference discharge time ($t_{REF}$) is stored in memory 116. In the exemplary embodiment, the reference discharge time ($t_{REF}$) is multiplied by the scaling factor and stored in random access memory (RAM) of the microprocessor as an unsigned 32 bit integer, a direct representation of the number of clock cycles elapsed from the start of the discharge to the end of the discharge. Other techniques may be used to measure and store the reference discharge time ($t_{REF}$).

Figure 3:
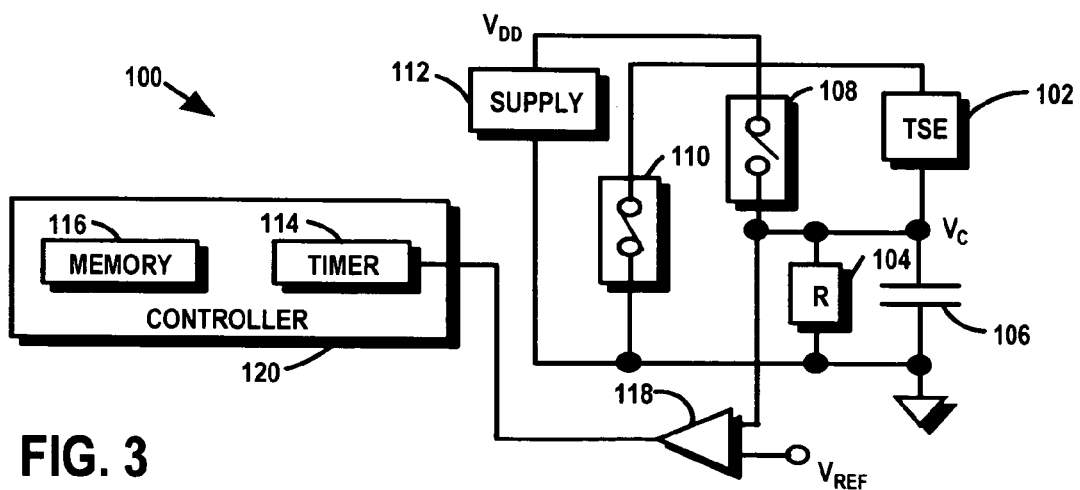
FIG. 3 is a block diagram of the temperature measuring apparatus in a temperature evaluation discharge configuration in accordance with the exemplary embodiment of the invention.

FIG. 3 is a block diagram of the apparatus 100 for measuring temperature in accordance with the exemplary embodiment of the invention in a temperature evaluation configuration. After the reference discharge time ($t_{REF}$) is determined, the capacitor 106 is charged to the supply voltage ($V_{DD}$) as described above. the temperature evaluation discharge time ($t_{TED}$) is determined by closing the second switch 110 and opening the first switch 108. the resulting configuration places the TSE 102 in parallel with the reference resistance 104 and the capacitor 106. In the exemplary embodiment, the timer 114 determines a number of clock cycles for the capacitor voltage ($V_C$) to decline from the supply voltage ($V_{DD}$) to the reference voltage ($V_{REF}$) to determine the temperature evaluation discharge time ($t_{TED}$). In the exemplary embodiment, $t_{TED}$ is stored in RAM of the microprocessor as a second unsigned 32 bit integer. the controller 120 calculates the value of the $t_{TED}/t_{REF}$ ratio from the two time discharge values stored in memory 116. the controller 120 determines the temperature using the value of the $t_{TED}/t_{REF}$ ratio and stored discharge time ratio information. In the exemplary embodiment, the discharge time ratio is compared to values in a discharge time ratio table to identify a corresponding temperature or interpolated temperature value.

Figures 4, 5:
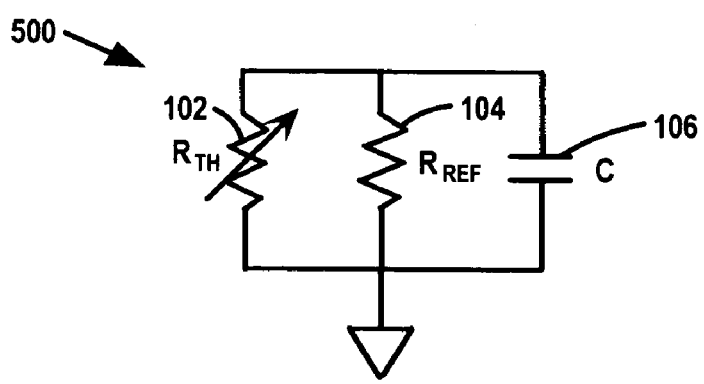
FIG. 4 is an illustration of a discharge time ratio information table in accordance with the exemplary embodiment of the invention.
FIG. 5 is a schematic representation of an equivalent circuit of the temperature measuring apparatus in the temperature evaluation configuration in accordance with the exemplary embodiment of the invention.

FIG. 4 is an illustration of a table 400 representing the discharge time ratio information stored in the memory 116 in accordance with the exemplary embodiment of the invention. the data representing the relationship between temperature 402 and the discharge time ratios 404 may be stored in memory 116 in any of several formats or arrangements including known techniques for storing information. the data storage discussed with reference to the table 400 can be applied to any type of data storage system or technique although the actual values and storage locations within the memory 116 may vary.

The discharge time ratio information 400 includes a plurality of temperature values 402 associated with a plurality of scaled discharge time ratios 404. the controller 120 scales the calculated discharge time ratio for a current sample and compares the scaled value to the scaled discharge time ratio values 404 in memory. Interpolation techniques may be used to identify temperatures values not included in the table 400. In the exemplary embodiment, discharge time ratios 404 representing 8 data points from minus 16 degrees Celsius to 96 degrees Celsius are store in an indexed table, with each successive index representing a temperature 402 equal to the previous index plus sixteen degrees. the ratios are scaled in order to represent decimal values within the range of zero to one using unsigned integers for optimal manipulation within the controller 120. the controller 120 uses interpolation to calculate the actual temperature of TSE 102 in the desired units of measurement (degrees Celsius in the exemplary embodiment). Selection of the end point values and quantity of intervening temperature data points in the table 400 are determined by the desired range of the measurement and the fit to the ideal temperature curve. Other values, ranges, and scaling factors are used in some situations and the actual values stored depend on the particular requirements of the temperature sensor. the discharge time ratio therefore may be raw, inverted, scaled or otherwise manipulated value related to the ratio of the discharge times. The values of the reference resistance 104 and the TSE 102 are selected such that a scaled ratio of 0.500 corresponds to 25° C. the reference resistance 104 is, therefore, equal to the TSE 102 resistance at 25° C. in the exemplary embodiment.

The values for the discharge time ratio information table 400 are calculated based on the reference resistance value and the TSE resistance vs. temperature relationship. The resistance of the TSE 102 is provided by the manufacturer and used to calculate the discharge time ratios for each temperature provided in the table 400. In the exemplary embodiment, manufacturer provided data points of the thermistor resistance and corresponding temperatures are used to generate a table that includes interpolated values for each degree Celsius. Using the nominal resistance value of the reference resistance and the interpolated thermistor resistance values, a parallel combination resistance value is determined. the resulting discharge time ratio values are used to provide the selected discharge time ratios stored ton the table 400.

For each of the selected data points for the exemplary embodiment, the following equation is computed for the corresponding ratio 404 to be stored in memory 116:

$$\text{Ratio}_{Temp(n)} = ((1/(1/R_{TSETemp(n)} + 1/R_{REF}))/R_{REF}) \times 32768 \quad (1)$$

restated:

$$\text{Ratio}_{Temp(n)} = ((R_{TSETemp(n)} \| R_{REF})/R_{REF}) \times 32768 \quad (2)$$

where $\text{Ratio}_{Temp(n)}$ is the stored discharge time ratio 404 and $R_{TSETemp(n)}$ is the thermistor resistance for each n. the scaling factor (32768) is selected to optimize the computational performance of the controller 120.

FIG. 5 is a schematic illustration of an equivalent circuit 500 formed when the apparatus 100 is in the temperature evaluation discharge configuration. By approximating the relationships of the values at various conditions, the operation of the equivalent circuit 500 and the relationship to the discharge time ratios can be observed. At low temperatures, the TSE 102 resistance ($R_{TH}$) becomes very large and can be approximated as open circuit relative to the reference resistance ($R_{REF}$). As the temperature is decreased, therefore, the equivalent circuit approaches the circuit formed when the apparatus is in the reference configuration. Accordingly, as the temperature is decreased, the value of the discharge time ratio ($T_{TED}/T_{REF}$) approaches one.

In the exemplary embodiment, the TSE 102 resistance is equal to the reference resistance 104 at 25° C. At this temperature, the ratio of the discharge times is equal to 0.5 since the effective resistance of the parallel combination is half of the reference resistance 104. As the temperature increases, the TSE 102 resistance ($R_{TH}$) decreases and at high temperatures has a resistance much lower than the reference resistance 104. As the temperature increases, therefore, the contribution of the reference resistance 104 to the parallel combination of a relatively low TSE 102 resistance diminishes. Accordingly, at high temperatures, the equivalent circuit 500 can be approximated as a parallel combination of the TSE 102 with the capacitor. the relatively low resistance of the TSE 102 forms an RC time constant that provides a relatively fast discharge time. It follows, therefore, that as temperature increases, the temperature evaluation discharge time approaches zero and the discharge time ratio ($T_{TED}/T_{REF}$) also approaches zero.

Figure 6:
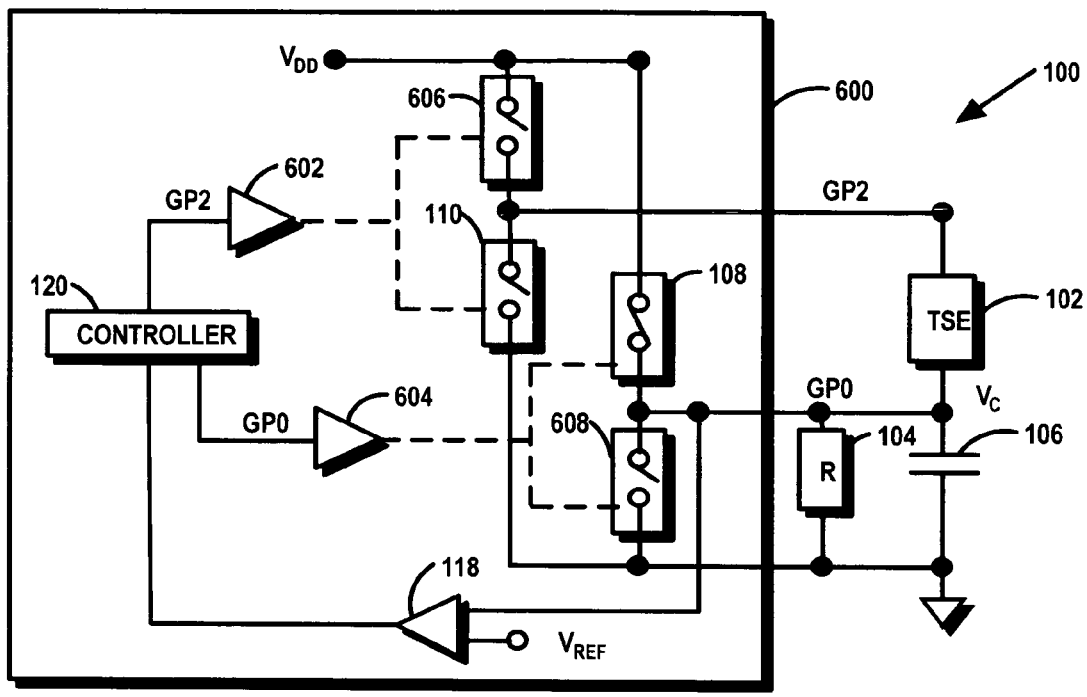
FIG. 6 is a block diagram of the temperature measuring apparatus where the controller and the switches are implemented as part of a microprocessor integrated circuit (IC).

FIG. 6 is block diagram of apparatus 100 in accordance with the exemplary embodiment where the switches, controller, timer, memory, and comparator are implemented as part of a microprocessor integrated circuit (IC). any of numerous microprocessor ICs may be used to perform the functions described herein. An example of a suitable IC is the PIC10F206 microprocessor available from the Microchip Corporation. Two of the General Purpose Input Output (GPIO) lines are used to perform the functions of the switches 108, 110. Each GPIO line is modeled as a data bus latch and level translator to control pairs of switches with one switch connected to the supply voltage and one switch connected to ground. Therefore, the GPIO line, GP0, is modeled as a latch 604 controlling the supply switch (first switch) 108 and a ground switch 608 where the supply switch 108 forms a connection to the supply voltage when closed and the ground switch 608 forms a connection to ground when closed. the GP2 line is modeled as a latch 602 controlling another ground switch (second switch) 110 and another supply switch 606.

To connect the apparatus 100 in the charging configuration, the software code running on the controller 120 places the latch 604 active "high" to set GP0 in a "high" state resulting in the supply voltage ($V_{DD}$) being applied at the GPIO output. the apparatus 100 remains in this state for period sufficiently long to minimize effects of any voltage drop due to the impedances of the IC 600. to place the apparatus 100 in the reference discharge configuration, the controller 120 sets the latch 604 inactive resulting in a high impedance at the output and an open circuit at the GPIO line. Accordingly, the capacitor discharges through the reference resistance to ground. the timer in the controller counts the number of clock cycles until the capacitor voltage $V_C$ declines to the reference voltage $V_{REF}$ which is equal to about 0.6 volts in the exemplary embodiment.

The capacitor is again charged by placing the GP0 to high state. the apparatus 100 is placed in the temperature evaluation configuration by turning off the GP0 and placing GP2 in a logic "low" state. Accordingly the TSE is grounded in parallel to the reference resistance and the capacitor. the controller 120 determines the discharge time ($t_{TED}$) through the parallel combination of the reference resistance and the TSE using the timer (counter) 114. The discharge time ratio $t_{TED}/t_{REF}$ is evaluating using the stored discharge time ratio information to determine the temperature as describe above.

Figure 7:
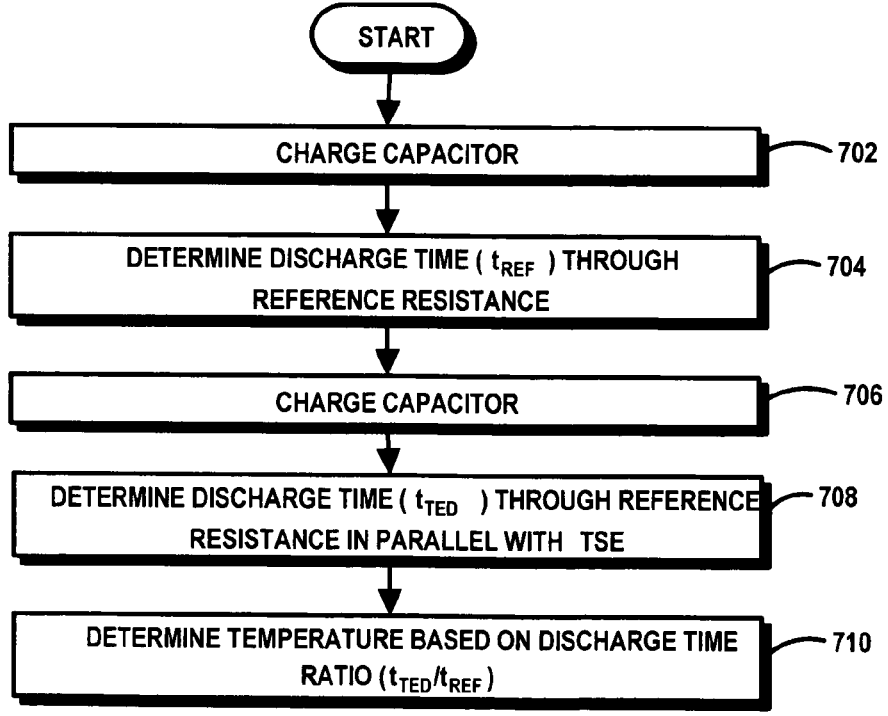
FIG. 7 is a flow chart of a method of measuring a temperature of a temperature sensing element in accordance with the exemplary embodiment of the invention.

FIG. 7 is a flow chart of a method of measuring a temperature of a temperature sensing element having a resistance dependent on temperature in accordance with the exemplary embodiment of the invention. the method may be performed with various combinations of integrated circuits (ICs), controllers, microprocessors, external components and other combination of hardware, software and/or firmware. In the exemplar embodiment, the temperature measuring procedure is performed by executing software code on the controller 120 to charge and discharge the external capacitor 106 through a reference resistor and the TSE to determine a discharge time ratio that is compared to discharge time information.

At step 702, the capacitor 106 is charged. In the exemplary embodiment, the GP2 GPIO port is set high to provide the supply voltage to the capacitor 106. the supply voltage is provided for a time period sufficient to charge the capacitor to $V_{DD}$.

At step 704, the reference discharge time ($t_{REF}$) is determined. the apparatus is configured to connect the reference resistance in parallel to the capacitor by turning off the GPIO lines to establish a high impedance at GP0 and GP2. the controller 120 determines the time for discharging the capacitor through the reference resistance using the timer 114. In the exemplary embodiment, the controller counts the number of clock cycles that accrue from the time the GPIO lines are turned off to the time comparator detects the capacitor voltage ($V_C$) has declined to the reference voltage ($V_{REF}$). the reference discharge time ($t_{REF}$) is stored in the memory 116.

After the capacitor is charged at step 706, the temperature evaluation discharge time (tTED) is determined as step 708. the apparatus 100 is configured to connect the reference resistance in parallel with the TSE 102 and the capacitor 106. In the exemplary embodiment, the GP0 line is set "low" to ground the TSE 102. the controller 120 measures the time to discharge the capacitor 106 through the parallel combination by counting the number of clock cycles that accrue before the comparator 118 detects the capacitor voltage ($V_C$) has declined to the reference voltage ($V_{REF}$).

At step 710, the temperature is determined based on the discharge time ratio, $t_{TED}/t_{REF}$. In the exemplary embodiment, the controller 120 divides the temperature evaluation reference time ($t_{TED}$) by the reference discharge time ($t_{REF}$) and compares the value to the ratios 404 of the discharge time ratio information stored in the memory 116 as discussed above. Interpolation is used in some circumstances to compute a temperature value that is between values contained in the table 400. Other techniques may be used to determine the temperature based on the discharge time ratio in some situations. For example, an algorithm may be applied to discharge time ratio to calculate the temperature.

Figure 8:
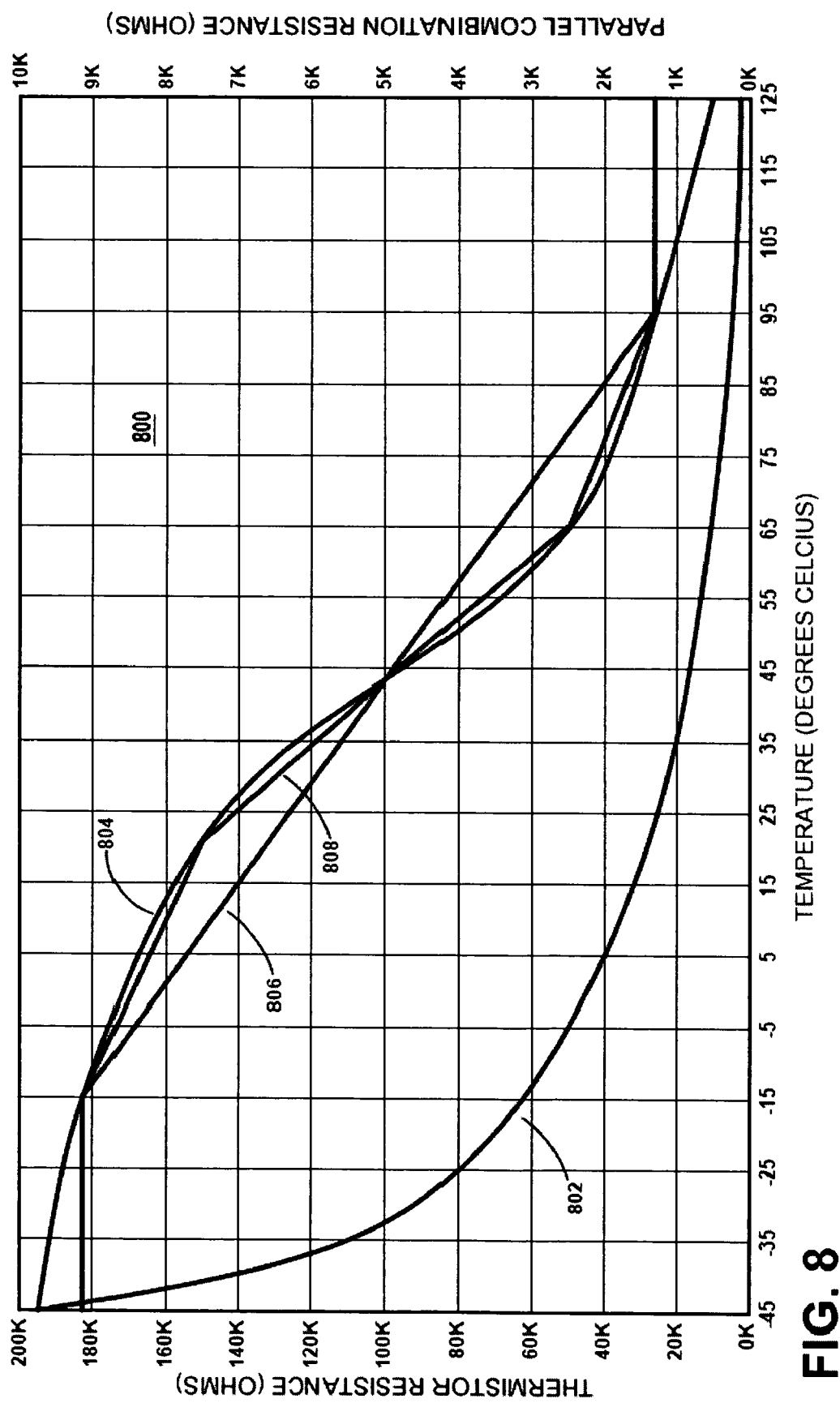
FIG. 8 is a graphical illustration of temperature versus resistance relationships for an exemplary thermistor and reference resistance.

FIG. 8 is a graphical illustration of temperature versus resistance relationships for an exemplary thermistor and reference resistance. the temperature vs. resistance curves 802-808 shown in the graph 800 illustrate relationships between the various curve approximations relative to the temperature vs. resistance curve of an exemplary thermistor having a nominal resistance of 10K Ohms at 25 degrees Celsius. the graphical illustrations in FIG. 8 provide relative comparisons of the relationships and may not necessarily be to scale. A parallel combination curve 804 is the resistance vs. temperature curve for a parallel combination of the thermistor with 10K Ohm reference resistance. the parallel combination curve 804 is more linear than the thermistor curve 802 due to affect of the reference resistance. the reference resistance behaves as a "linearizer" to the resistance vs. temperature curve of the thermistor (TSE). Typical relationships between the resistance and temperature of thermistors are exponential. the parallel combination of the reference resistor with the thermistor (TSE) results in a curve that is less exponential. This concept is easily understood by observing that, at temperatures near the center of the curve, changes in temperature translate to smaller resistance changes of the parallel combination than resistance changes of the thermistor alone. By selecting appropriate data points to store in the controller 120, an approximation of the relationship is maintained in memory 116 for determining temperature in accordance with the exemplary embodiment. A linear approximation curve 806 provides data for determining temperatures from −16 to 95 degrees Celsius Although only two data points need to be stored in memory 114, some inaccuracy results. Curve fitting techniques using a larger number of data points result in approximation curves 808 providing increased accuracy at the cost of more memory 114 space. Accordingly, the data stored in memory 114 depends on the desired performance and particular implementation.

Therefore, in the exemplary embodiment, the temperature of the TSE 102 having a resistance dependent on temperature is determined based on a discharge time ratio of the discharge time of the capacitor 106 through a parallel combination of the reference resistance 104 and the TSE 102 to the discharge time through the reference resistance 104. The exemplary method and apparatus have several advantages over conventional temperature measuring techniques. For example, the absolute value of the supply voltage is not critical to accuracy of the temperature. Only changes in the supply voltage between the first and second measurements affect the measurement accuracy. Since the procedure is relatively fast, relatively slow changes in supply voltage, such as those changes due to changing battery charge, do not affect the accuracy of the measurement. Further, the measurement accuracy degradation due to component value changes is minimized. Since ratios of the discharge times are used to determine temperature, characteristics of many components that vary due to manufacturing, age, or temperature do not result in degradation of performance. For example, if the capacitance of the capacitor changes over temperature, the accuracy of the temperature measurement will not be affected. the change in the RC time constant due to the change in capacitance does not affect the accuracy since the time constant change will affect both of the discharge times and the ratio will not reflect the change in capacitance (assuming that any change in capacitance during the short measurement procedure is slight). As discussed above, the reference resistance behaves as "linearizer" to the resistance vs. temperature curve of the TSE. Typical relationships between the resistance and temperature of a thermistor are exponential. the parallel combination of the reference resistor with the thermistor (TSE) results in a curve that is less exponential. Further advantages may be realized when a microprocessor 600 is used to implement the apparatus and method. For example, only two GPIO lines are necessary to perform the temperature measurement Clearly, other embodiments and modifications of this invention will occur readily to those of ordinary skill in the art in view of these teachings. the above description is illustrative and not restrictive. This invention is to be limited only by the following claims, which include all such embodiments and modifications when viewed in conjunction with the above specification and accompanying drawings. the scope of the invention should, therefore, be determined not with reference to the above description, but instead should be determined with reference to the appended claims along with their full scope of equivalents.

What is claimed is:

1. An apparatus for measuring temperature, the apparatus comprising:
   a temperature sensing element having a resistance dependent on temperature;
   a reference resistance;
   a capacitor connected in parallel to the reference resistance;
   a timer configured to:
      determine the reference discharge time by counting a number of clock cycles required for discharging the capacitor from the first voltage to the second voltage through the reference resistance; and
      determine a temperature evaluation discharge time by counting another number of clock cycles required for discharging the capacitor from the first voltage to the second voltage through a parallel combination resistance of the reference resistance connected in parallel with the temperature sensing element;

a memory to store discharge time ratio information based on the reference discharge time; and a controller configured to:
determine a temperature of the temperature sensing element based on a discharge time ratio of the reference discharge time and the temperature evaluation time by comparing the discharge time ratio to the discharge time information stored in the memory.

2. The apparatus of claim 1, wherein the discharge time information comprises the reference discharge time.

3. The apparatus of claim 1, wherein the discharge information comprises a plurality of stored discharge time ratios associated with a plurality of temperature values.

4. The apparatus of claim 3, wherein the plurality of discharge time ratios are scaled.

5. The apparatus of claim 2, further comprising a microprocessor integrated circuit configured to charge the capacitor by providing a logic "high" signal to the capacitor.

6. The apparatus of claim 5, the microprocessor configured to determine the reference discharge time by changing the logic "high" signal to an off state where high impedance relative to the reference resistance is presented to the capacitor.

7. The apparatus of claim 6, wherein the determining the temperature evaluation discharge time comprises presenting a logic "low" signal to the temperature sensing element to connect the temperature sensing element in parallel with the reference resistance.

8. The apparatus of claim 1, wherein the temperature sensing element is a thermistor.

9. The apparatus of claim 1, further comprising a comparator for comparing capacitor voltage to a reference voltage equal to the second voltage and indicating when the capacitor voltage has declined to the second voltage.

10. The apparatus of claim 7, wherein the microprocessor comprises:
a first general purpose input-output (GPIO) port to connect to the reference resistance, the capacitor, and the first port of the temperature sensing;

a second GPIO port to connect to the second port of the temperature sensing element; and the controller, the controller configured to:
set the second GPIO port to an off state to present a high impedance greater than the reference resistance, set the first GPIO port to the logic "high" voltage to charge the capacitor to the logic "high" voltage before setting the first GPIO port to the off state;

determine the reference discharge time for discharging the capacitor from the logic high voltage to the reference voltage through the reference resistance while the first GPIO port and the second GPIO port are in the off state; and set the second GPIO port to a logic "low" voltage to ground the second port of the temperature sensing element, set the first GPIO port to the logic "high" voltage before setting the first GPIO port to the off state.

* * * * *